United States Patent
Tsuchiya et al.

(10) Patent No.: US 6,730,153 B2
(45) Date of Patent: May 4, 2004

(54) OIL-BASED INK-JET RECORDING INK

(75) Inventors: Tatsurou Tsuchiya, Osaka (JP); Masanori Kano, Osaka (JP)

(73) Assignee: Sakata Inx Corp., Osaka (JP)

( * ) Notice: Subject to any disclaimer, the term of this patent is extended or adjusted under 35 U.S.C. 154(b) by 0 days.

(21) Appl. No.: 10/362,217
(22) PCT Filed: Aug. 30, 2001
(86) PCT No.: PCT/JP01/07460
§ 371 (c)(1), (2), (4) Date: Feb. 26, 2003
(87) PCT Pub. No.: WO02/18505
PCT Pub. Date: Mar. 7, 2002

(65) Prior Publication Data
US 2003/0177946 A1 Sep. 25, 2003

(30) Foreign Application Priority Data
Aug. 31, 2000 (JP) ........................................ 2000-263160

(51) Int. Cl.⁷ ............................................... C09D 11/00
(52) U.S. Cl. ................................ 106/31.62; 106/31.72; 106/31.73
(58) Field of Search ........................... 106/31.62, 31.72, 106/31.73

(56) References Cited
FOREIGN PATENT DOCUMENTS

| EP | 1314767 A1 * | 5/2003 | ........... C09D/11/00 |
| WO | WO 91/07470 | 5/1991 | |
| WO | WO 96/24642 | 8/1996 | |
| WO | WO 99/38925 | 8/1999 | |
| WO | WO 0071627 | 11/2000 | |

* cited by examiner

*Primary Examiner*—C. Melissa Koslow
*Assistant Examiner*—Veronica F. Faison
(74) *Attorney, Agent, or Firm*—Armstrong, Kratz, Quintos, Hanson & Brooks, LLP

(57) ABSTRACT

An ink-jet recording oil-based ink which has satisfactory pigment dispersibility both at the beginning of storage and even during long-term storage and provides excellent spouting stability without being influenced by temperature changes in printing circumstances. The ink comprises a pigment; a dispersing agent comprising a reaction product of a polyamine compound and a self condensation product of 12-hydroxystearic acid; a saturated hydrocarbon solvent comprising a liquid paraffin as a main component; and a vegetable oil, the ink having a surface tension of 26 to 30 dyne/cm at 25° C. and a contact angle on a polytetrafluoroethylene plate of 40° to 50° at 25° C., and satisfying the following relationship:

$$W_{HC}/W_{VC} > 10$$

wherein $W_{HC}$ is the weight of the saturated hydrocarbon solvent and $W_{VC}$ is the weight of the vegetable oil.

8 Claims, No Drawings

OIL-BASED INK-JET RECORDING INK

TECHNICAL FIELD

The present invention relates to an ink-jet recording oil-based ink. More particularly, the invention relates to an ink-jet recording oil-based ink which has satisfactory pigment dispersibility both at the beginning of storage and even during long-term storage and provides excellent spouting stability without being influenced by temperature changes in printing circumstances.

BACKGROUND ART

In the field of an ink-jet recording system, both sides of apparatus and ink have been studied so that an image having clear colors can be stably printed at a higher speed without decrease in density and without bleeding.

Currently, as a printing apparatus, a system using a piezo-vibrating element, a system using a thermal head, a system utilizing an electric attraction, and the like, are known.

Among them, the system using a piezo-vibrating element is highly useful from the viewpoint that the constitution of a recording head as a device is simple, and restrictions on electric and thermal performance to ink are less as compared with the other systems. Besides, as ink which is applied to a printing apparatus of this type, an oil-based type of ink in which a pigment is dispersed in a saturated hydrocarbon medium has been recently put to practical use.

However, a pigment type of ink intrinsically has the so-called problem of low reliability as an inkjet recording liquid, such as poor storage stability of the ink itself or poor ink spouting stability.

The main stream of currently available ink-jet recording oil-based ink is one wherein an isoparaffin solvent or a cycloparaffin solvent, the typical examples of which are Isopar series and Exxsol series, made by Exxon Chemical Company, is used alone as the saturated hydrocarbon solvent. However, the available ink has poor storage stability at low temperatures or is liable to cause clogging of nozzles, and thus does not have satisfactory performance.

In order to solve these problems, for example, a method in which a saturated hydrocarbon type organic solvent is used in combination with a highly polar solvent such as oleyl alcohol is disclosed in JP10-507487A and the like. However, when a saturated hydrocarbon solvent is used in combination with a highly polar solvent, there is a problem that the storage stability of ink is still more decreased so that a pigment is precipitated during storage.

Further, an inkjet recording oil-based ink wherein a liquid paraffin is used as a saturated hydrocarbon solvent and a compound having a long-chain alkyl group and a residual group of a dibasic acid is used as a dispersing agent is disclosed in International Publication No. WO099/38925. However, this system has the problem that it has poor spouting stability at low temperatures although it has spouting stability at ordinary temperatures.

The present inventors had discovered that an ink-jet recording oil-based ink which has satisfactory storage stability both in the beginning of storage and during long periods of storage and provides excellent spouting stability over a wide temperature range from a low temperature to a high temperature could be obtained by using 10 to 100 parts by weight of a vegetable oil relative to 100 parts by weight of a saturated hydrocarbon solvent as a solvent for an ink-jet recording ink, regardless of the type of materials such as saturated hydrocarbon solvent and dispersing agent, and disclosed this ink in International Application No. PCT/JP99/07243.

It is an object of the present invention to provide an ink-jet recording oil-based ink excellent in the above-mentioned properties by using a smaller amount of a vegetable oil than that in the ink-jet recording oil-based ink disclosed in the international application.

DISCLOSURE OF INVENTION

The present inventors have intensively conducted research to provide an ink-jet recording oil-based ink excellent in the above-mentioned properties by using a smaller amount of a vegetable oil and discovered that the object is accomplished by using a reaction product of a polyamine compound and a self condensation product of 12-hydroxystearic acid as a dispersing agent and a liquid paraffin as a main component of a saturated hydrocarbon solvent, thereby completing the present invention.

Thus, the present invention provides ink-jet recording oil-based inks as follows:

(1) An ink-jet recording oil-based ink comprising a pigment; a dispersing agent comprising a reaction product of a polyamine compound and a self condensation product of 12-hydroxystearic acid; a saturated hydrocarbon solvent comprising a liquid paraffin as a main component; and a vegetable oil, the ink having a surface tension of 26 to 30 dyne/cm at 25° C. and a contact angle on a polytetrafluoroethylene plate of 40° to 50° at 25° C., and satisfying the following relationship:

$$W_{HC}/W_{VC} > 10$$

wherein $W_{HC}$ is the weight of the saturated hydrocarbon solvent and $W_{VC}$ is the weight of the vegetable oil.

(2) The ink-jet recording oil-based ink of (1) above, wherein the dispersing agent comprises a reaction product of polyallylamine and a self condensation product of 12-hydroxystearic acid.

(3) The ink-jet recording oil-based ink of (1) or (2) above, wherein the content of the liquid paraffin in the saturated hydrocarbon solvent is 70% by weight or more.

(4) The ink-jet recording oil-based ink of any one of (1) to (3) above, wherein the liquid paraffin contains 20% by weight or more of a monocyclic cycloparaffin, and has a surface tension of 26 to 30 dyne/cm at 25° C. and a viscosity of 20 mPa·s or less at 25° C.

(5) The ink-jet recording oil-based ink of any one of (1) to (4) above, wherein the saturated hydrocarbon solvent further contains an isoparaffin.

(6) The ink-jet recording oil-based ink of any one of (1) to (5) above, which further contains a petroleum resin and/or a rosin-modified maleic resin.

(7) The ink-jet recording oil-based ink of any one of (1) to (6) above, which has a solidifying point of −10° C. or less.

(8) The ink-jet recording oil-based ink of any one of (1) to (7) above, which has a volume resistivity of $10^8$ Ω·cm or more.

Hereinafter, the present invention will be more specifically explained.

First, as pigments used in the present invention, various inorganic or organic pigments which can be used in a common ink-jet recording ink can be used. Examples of particularly useful ones include C.I. Pigment Yellow 93, 95, 109, 110, 120, 128, 138, 139, 151, 154, 155, 173, 180, 185 and 193; C.I. Pigment Orange 34, 36, 43, 61, 63 and 71; C.I.

Pigment Red 122, 202, and a solid solution of C.I. Pigment Red 122 and 202; C.I. Pigment Blue 15; C.I. Pigment Violet 19, 23 and 33; C.I. Pigment Black 7; and the like.

In an ink-jet recording system, the four colors of yellow, magenta, cyan and black are basically used, and recently the six colors in which orange and green are added thereto are used, and furthermore the eight colors in which light-magenta and light-blue are added thereto are used to form a color image, and the like.

In order to provide these hues, pigments which are excellent in weather resistance among the above-mentioned ones are preferable. Among others, C.I. Pigment Yellow 138, 154, 180 and 185 for yellow; C.I. Pigment Red 122 and 202, and C.I. Pigment Violet 19 for magenta; C.I. Pigment Blue 15 for cyan; an acidic or neutral C.I. Pigment Black 7 for black; C.I. Pigment Orange 43, 64 and 71 for orange; and C.I. Pigment Green 7 and 36 for green are more preferable.

In the present invention, a preferable amount of a pigment is 0.5 to 30% by weight, more preferably 1 to 10% by weight, in an ink-jet recording ink. When the amount of a pigment is too small, the color density of ink is lowered, while too large, printing becomes difficult due to the viscosity or flowability of ink.

In the present invention, as dispersing agents which are used to disperse a pigment into an organic solvent, reaction products of a polyamine compound and a self condensation product of 12-hydroxystearic acid can be used. Specific examples thereof include a reaction product of a polyallylamine and a self condensation product of 12-hydroxystearic acid; a reaction product of a polyethylenepolyamine and a self condensation product of 12-hydroxystearic acid, such as Solsperse 13940 (made by Zeneka Co., Ltd.) as a commercial product, and the like; a reaction product of a dialkylaminoalkylamine and a self condensation product of 12-hydroxystearic acid, such as Solsperse 17000, 18000 (both made by Zeneka Co., Ltd.) as a commercial product, and the like.

Particularly, a reaction product of a polyallylamine and a self condensation product of 12-hydroxystearic acid is preferable as a dispersing agent since the dispersibility of an organic pigment is satisfactory both in the beginning of storage and during long-term storage and the ink spouting stability is also excellent.

In the present invention, a saturated hydrocarbon solvent comprising a liquid paraffin as a main component is used. Herein, the term "liquid paraffin" refers to a mixture mainly comprising three components of a normal paraffin, an isoparaffin and a monocyclic cycloparaffin, which is obtained by highly refining a relatively volatile lubricating oil fraction through a sulfuric-acid washing or the like, and includes one referred to as "volatile liquid paraffin" in the Japanese Pharmacopoeia. Particularly, a liquid paraffin containing 20% by weight or more of a monocyclic cycloparaffin is preferable.

As the liquid paraffin, one which is refined to such a level that ultraviolet absorbing impurities are not substantially contained therein, and according to the purpose of use, passes at least one test selected from the group consisting of a purity test for liquid paraffin prescribed in the Japanese Pharmacopoeia, a purity test for liquid paraffin prescribed in the Japanese Standards of Food Additives and a purity test for liquid paraffin prescribed in the Japanese Standards for Cosmetic Ingredients, is more preferable even from the viewpoint of workability and hygiene.

The above-mentioned three purity tests for liquid paraffin and the standard values are described in the fourteenth revised Japanese Pharmacopoeia, the seventh edition of the Official Standards of Food Additives, and the Standards for Cosmetic Ingredients as based on Notification No. 181 of the Ministry of Public Welfare, respectively, as the newest ones. Examples of liquid paraffins each of which passes all the three purity tests include MORESCO WHITE P-40, MORESCO WHITE P-55 (both made by MATSUMURA OIL RESEARCH CORP.), Liquid Paraffin No. 40-S, Liquid Paraffin No. 55-S (both made by Chuo Kasei Co., Ltd.).

An isoparaffin solvent or a cycloparaffin solvent can also be used in combination with the liquid paraffin. Examples of the isoparaffin solvent include isodecane, isododecane, and commercially available mixtures of isoparaffins such as Isopar E, Isopar G, Isopar H, Isopar L and Isopar M (all the above-mentioned made by Exxon Chemical Company), Shellsol (made by Shell Chemical Company), Soltrol (made by Philips Oil Co., Ltd.), Begasol (made by Mobil Petroleum Co., Inc.) and IP Solvent 2835 (made by IDEMITSU PETROCHEMICAL CO., LTD.). Examples of the cycloparafin solvent include cyclooctane, cyclodecane, decalin, and commercially available mixtures of cycloparaffins such as Exxsol D130 and D140 (both made by Exxon Chemical Company).

In the case of requiring ink which maintains a liquid state at a lower temperature, the use of an isoparaffin hydrocarbon solvent having a low solidifying point in combination with a liquid paraffin is preferable. In the case of providing satisfactory spouting stability by drawing back the ink remaining at the tip of a nozzle to the interior thereof so as to prevent the drying of the ink, the use of a cycloparaffin having a high surface tension in combination with a liquid paraffin is preferable.

When a liquid paraffin is used as a main component and a suitable amount of other saturated hydrocarbon solvent is added thereto depending upon the performance required for the ink, as mentioned above, it is possible to prepare an ink-jet recording ink having a well-balanced performance, as compared with the case where an isoparaffin solvent such as Isopar or a cycloparaffin such as Exxsol is used alone. The content of a liquid paraffin is preferably 70% by weight or more relative to the whole amount of saturated hydrocarbon solvents.

As a saturated hydrocarbon solvent mainly composed of a liquid paraffin, from the viewpoint of ink spouting stability, one having a viscosity of 20 mPa·s or less at 25° C. is preferable. Besides, a mixture of a saturated hydrocarbon solvent having a low viscosity and a saturated hydrocarbon solvent having a high viscosity which mixture is adjusted to have the above-mentioned viscosity can also be used. In order to speedily fill a nozzle with ink and to prevent the clogging of the nozzle, the saturated hydrocarbon solvent mainly composed of a liquid paraffin preferably has a surface tension of 26 to 30 dyne/cm at 25° C. For the same reason, the liquid paraffin which is the main component of the saturated hydrocarbon solvent preferably has a viscosity of 20 mPa·s or less at 25° C. and a surface tension of 26 to 30 dyne/cm at 25° C.

Furthermore, when a balance between an increase in printing speed due to drying by evaporation and clogging of a nozzle is taken into consideration, it is preferable that the boiling point of the saturated hydrocarbon solvent is in the range of 180° to 360° C./760 mmHg. When a mixture of saturated hydrocarbon solvents is used, it is preferable that most of the components thereof have boiling points within the above-mentioned range.

In the present invention, a vegetable oil is used as an asistant agent for improving the pigment dispersibility and the ink spouting.

As vegetable oils which can be used in the present invention, semidrying oils such as soybean oil, cotton seed oil, sunflower oil, rape seed oil, mustard oil, sesame oil and corn oil; nondrying oils such as olive oil, peanut oil and tsubaki oil; and drying oils such as linseed oil and safflower oil can be enumerated. These vegetable oils may be used alone or as a mixture thereof.

In particular, from the viewpoint of properties, semidrying oils and nondrying oils which are low in polymerization property due to oxidation are preferable; among others, rape seed oil and olive oil, which are lower in viscosity; and soybean oil, which is inexpensive, are more preferable.

In the present invention, amounts of a saturated hydrocarbon solvent and a vegetable oil satisfy the following relationship:

$$W_{HC}/W_{VC} > 10$$

wherein $W_{HC}$ is the weight of the saturated hydrocarbon solvent and $W_{VC}$ is the weight of the vegetable oil. The upper limit of $W_{HC}/W_{VC}$ is preferably about 500, more preferably about 100 from the viewpoint of the pigment dispersibility and the ink spouting stability.

Furthermore, in order to improve fixing property of ink to a matter to be printed, and the like, various binder resins as used in common ink-jet recording oil-based inks can be used; among others, petroleum resins and rosin-modified maleic resins which are effective for re-dissolution of ink are preferable. Besides, a pigment derivative and a surface active agent which are effective for dispersing of a pigment, and various additives such as a viscosity modifier, can be added thereto.

As a method of producing an ink-jet recording oil-based ink by using these materials, a method comprising the steps of: dissolving a dispersing agent into a saturated hydrocarbon solvent to prepare a solution of the dispersing agent; and adding with agitating a pigment, if necessary, a surface active agent or the like thereto and grinding the same by means of a grinder; and thereafter, if necessary, adding and mixing remaining materials thereto can be used.

As the above-mentioned grinder, for example, a wet circulation mill, a beads mill, a ball mill, a sand mill, Attritor, a roll mill, an agitator, Henschel mixer, a colloid mill, an ultrasonic homogenizer, an ultra-high pressure homogenizer, a perl mill, and the like can be enumerated; in particular, in the case of an inkjet recording liquid, it is necessary to more finely disperse a pigment as compared with a common printing ink, and thus, among the above-mentioned types, the wet circulation mill is preferred.

The ink-jet recording oil-based ink of the present invention is required to have a surface tension in the range of 26 to 30 dyne/cm at 25° C. and a contact angle on the surface of a polytetrafluoroethylene plate in the range of 40° to 50° at 25° C. When ink has the properties within these ranges, the interior of a nozzle can be speedily filled with the ink, and the clogging of the nozzle can be reduced. The above-mentioned values of the contact angle on a polytetrafluoroethylene plate are obtained as follows: A polytetrafluoroethylene (PTFE) plate having a suitable thickness is used. At an ambient temperature of 25° C., a drop of ink is dropped with a syringe on the horizontal plane thereof, and immediately after the ink comes into contact with the PTFE plate, a contact angle is determined.

From the viewpoint of providing satisfactory storage stability at a low temperature, the ink preferably has a solidifying point of −10° C. or less. Furthermore, the ink preferably has a viscosity in the range of 1.0 to 30.0 mPa·s, more preferably in the range of 10 to 20.0 mPa·s, at an ambient temperature on use. An ink-jet recording ink having a viscosity in this range provides spouting property capable of following up the printing speed and satisfactory spouting stability in a high speed printing.

The ink of the present invention should have the above-mentioned physical properties as a finished ink composition. However, since the above-mentioned physical properties are governed particularly by the saturated hydrocarbon solvent which is a main essential component, it is preferable to select a saturated hydrocarbon solvent which, as a mixture when mixed saturated hydrocarbon solvents are used, has the above-mentioned surface tension and contact angle, and a low viscosity and further a solidifying point of −10° C. or less.

The ink-jet recording oil-based ink of the present invention is suitable for an on-demand ink-jet recording system in which a piezo-vibrating element is used to spout ink, and provides satisfactory spouting stability in printing apparatuses using an ink-jet recording oil-based ink, which are currently placed on the market.

The ink-jet recording oil-based ink of the present invention preferably has a volume resistivity of $10^8$ Ω·cm or more; however, a charging agent is not contained therein. Therefore, the spouting property as required for the ink-jet recording ink of the present invention is inherently different from that as required for ink which is used in an ink-jet recording system wherein electrical attraction generated between charged ink droplets and an electrode is utilized to continuously fly the droplets.

The ink-jet recording ink of the present invention has satisfactory pigment dispersibility both at the beginning of storage and even during long-term storage and provides excellent spouting stability over a wide temperature range from a low temperature to a high temperature.

BEST MODE FOR CARRYING OUT THE INVENTION

Hereinafter, the present invention will be more specifically explained by means of Examples; however, the present invention is not intended to be limited to the Examples. In the Examples, "part(s)" and "%" represent part(s) by weight and % by weight, respectively, unless otherwise noted.

EXAMPLES 1 TO 11 AND COMPARATIVE EXAMPLES 1 TO 4

Preparation of Base Inks

Three parts of a reaction product of polyallylamine and a self condensation product of 12-hydroxystearic acid as a dispersing agent was dissolved into 12 parts of Liquid Paraffin No. 40-S (made by Chuo Kasei Co., Ltd.), and 5 parts of Fastogen Super Red 7061B (made by Dainippon Ink & Chemicals, Inc.) as a pigment was added thereto with agitating, and thereafter, the resultant mixture was ground by using a beads mill to obtain base ink No. 1.

Three parts of Solsperse 17000 as a dispersing agent was dissolved into 12 parts of Liquid Paraffin No. 40-S, and 5 parts of Carbon Black MA-7 (made by Mitsubishi Chemical Corporation) as a pigment was added thereto with agitating and thereafter, the resultant mixture was ground by using a beads mill to obtain base ink No. 2.

Three parts of Solsperse 17000 as a dispersing agent was dissolved into 12 parts of IP Solvent 2835 which is an isoparaffin solvent (made by IDEMITSU PETROCHEMICAL CO., LTD.), and 5 parts of Carbon Black MA-7 (made by Mitsubishi Chemical Corporation) as a pigment was added thereto with agitating and thereafter, the resultant mixture was ground by using a beads mill to obtain base ink No. 3.

Preparation of Ink-Jet Recording Inks

According to the formulations shown in Table 1 (the numerical values regarding the composition in Table 1 show parts), various materials were mixed with agitating to obtain ink-jet recording inks of Examples 1 to 11 and Comparative Examples 1 to 4, each of which had a viscosity of about 10 mP·s at 25° C.

Incidentally, No. 55-S is a liquid paraffin (made by Chuo Kasei Co., Ltd.); Isopar M is a mixture of isoparaffins (Exxon Chemical Company); and Exxsol D130 is a mixture of cycloparaffin and paraffin (Exxon Chemical Company).

Performance Evaluation a. Determination of Surface Tension

A surface tension of each of the ink-jet recording inks of Examples 1 to 11 and Comparative Examples 1 to 4 was determined at 25° C. by using a surface tension meter (a dynamic wetting tester, made by RHESCA CORP.). The results are shown in Table 1.

b. Determination of Contact Angle

At 25° C., a drop of ink was dropped with a syringe on the horizontal plane of a PTFE plate (with a thickness of 1.0 mm) made by Sunplatec Co., Ltd. Then, a contact angle was determined immediately after the ink came into contact with the PTFE plate. Incidentally, the present inventors disclosed a contact angle of ink to an ethylene fluoride/propylene copolymer film in International Application No. PCT/JP99/07243. However, there is a possibility that a contact angle varies depending upon changes in copolymerizing ratio of ethylene fluoride and propylene. In the present invention, a contact angle of ink to a polytetrafluoroethylene plate which involves no variable factor was determined.

c. Low Temperature Storage Stability

Each of the ink-jet recording inks of Examples 1 to 11 and Comparative Examples 1 to 4 was introduced into a glass bottle and the bottle was stoppered tightly. The bottle was allowed to stand at 0° C. for one month, and then further at −10° C. for one month. The low temperature storage stability was evaluated on the basis of presence or absence of a precipitate and state of the precipitate.

A: No precipitate is formed.

B: Some precipitate is formed, which is dissolved after a light shaking.

C: Precipitate is not dissolved even after a severe shaking.

d. Spouting Stability at Ordinary Temperature

At a temperature of 20° C. which is generally considered to be a temperature in a room, a printing apparatus (IP-4000, a piezo-type, made by Seiko Instruments Co., Ltd.) adapted to a commercially available ink-jet recording oil-based ink was used to conduct continuous solid-printing on a specialized glossy paper sheet (rolled paper sheet) using each of the ink-jet recording inks of Examples 1 to 11 and Comparative Examples 1 to 4, and the printed paper sheet was cut to a size corresponding to the size "A0" to give one hundred sheets of printed matter. On the basis of the number of sheet when non-printed portion (namely, a portion on which no printing is made since no ink has been spouted from almost all nozzles) occurs after the beginning of printing, the spouting stability at ordinary temperature was evaluated.

A: Non-printed portion occurs after seventy-first sheet, or non-printed portion does not occur by one hundredth sheet.

B: Non-printed portion occurs on a fifty-first to seventy-first sheet.

C: Non-printed portion occurs on a thirty-first to fiftieth sheet.

D: Non-printed portion occurs by thirtieth sheet.

e. Spouting Stability at Low Temperature

The spouting stability of each of the ink-jet recording inks of Examples 1 to 11 and Comparative Examples 1 to 4 at a low temperature was evaluated in the same evaluation manner and on the basis of the same evaluation criteria as those of the above-mentioned spouting stability at ordinary temperature, except that the room temperature was changed to 5° C.

f. Drying Property of Ink on Paper Substrate

Under an ambient condition where the room temperature was 25° C. and the relative humidity was 60%, each of the ink-jet recording inks of Examples 1 to 11 and Comparative Examples 1 to 4 was solid-printed on a specialized glossy paper sheet by using the same printer adapted to an ink-jet recording oil-based ink as the above-mentioned. On the basis of a period from the time of printing to the time when the recording liquid has not adhered to a finger touched thereto, the drying property of the ink was evaluated.

A: Dried within 2 seconds.

B: Dried within 5 seconds over 2 seconds.

C: Not dried even over 5 seconds.

Additionally, regarding the spouting stability at ordinary temperature and that at low temperature in the above-mentioned evaluation, it was judged that each of grades "A" and "B" is of good performance; grade "C" is of such performance that there is no problem in view of use; and grade "D" is of such performance that causes inconvenience in view of use, while regarding the other items, grade "A" is of good performance; grade "B" is of such performance that there is no problem in view of use; and grade "C" is of such performance that causes inconvenience in view of use.

TABLE 1

|  | Ex. | | | | | | | | | | | Com. Ex. | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 1 | 2 | 3 | 4 |
| Ink composition | | | | | | | | | | | | | | | |
| No. 40-S | 40 | 40 | 40 | 40 | 40 | 40 | 40 | 40 | 40 | 40 | 40 | — | 40 | — | 40 |
| No. 55-S | 39.8 | 39.5 | 39 | 36 | 32 | 39.5 | 36 | 36 | 16 | 16 | 34 | — | — | — | 40 |
| Isopar M | — | — | — | — | — | — | — | — | 20 | — | — | 76 | 36 | 40 | — |
| IP Solvent 2835 | — | — | — | — | — | — | — | — | — | — | — | — | — | 20 | — |
| Exxsol D130 | — | — | — | — | — | — | — | — | — | 20 | — | — | — | — | — |
| Rape seed oil | 0.2 | 0.5 | 1 | 4 | 8 | 0.5 | 4 | 4 | 4 | 4 | 1 | 4 | 4 | — | — |
| Oleyl alcohol | — | — | — | — | — | — | — | — | — | — | — | — | — | 20 | — |
| Petroleum resin | — | — | — | — | — | — | — | — | — | — | 5 | — | — | — | — |

TABLE 1-continued

|  | Ex. | | | | | | | | | | | Com. Ex. | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 1 | 2 | 3 | 4 |
| Base ink |  |  |  |  |  |  |  |  |  |  |  |  |  |  |  |
| No. 1 | 20 | 20 | 20 | 20 | 20 | — | — | — | 20 | 20 | 20 | 20 | 20 | — | — |
| No. 2 | — | — | — | — | — | 20 | 20 | — | — | — | — | — | — | — | 20 |
| No. 3 | — | — | — | — | — | — | — | 20 | — | — | — | — | — | 20 | — |
| $W_{HC}/W_{VO}$ | 459 | 183 | 91 | 21.8 | 10.4 | 183 | 21.8 | 21.8 | 21.8 | 173 | 86 | 22 | 22 | x | x |
| Ink characteristics |  |  |  |  |  |  |  |  |  |  |  |  |  |  |  |
| Surface tension (dyne/cm) | 28 | 28 | 28 | 28 | 28 | 28 | 28 | 28 | 26 | 28 | 29 | 24 | 25 | 28 | 26 |
| Contact angle (degree) | 46 | 46 | 46 | 46 | 46 | 47 | 47 | 44 | 43 | 47 | 48 | 35 | 38 | 43 | 44 |
| Law temperature storage stability | B | B | B | B | A | B | B | A | A | B | B | C | A | B | C |
| Spouting stability at ordinary temp. | B | B | B | A | A | B | A | B | C | A | A | D | D | C | D |
| Spouting stability at low temp. | C | C | B | B | A | C | B | B | B | B | B | D | D | D | D |
| Drying property on paper substrate | A | A | A | A | A | A | A | A | A | A | A | A | A | A | A |

$W_{HC}$: Weight of saturated hydrocarbon sovent contained in ink
$W_{VO}$: Weight of vegetable oil contained in ink As specifically shown by means of Examples and Comparative Examples, the ink-jet recording oil-based ink of the present invention has satisfactory pigment dispersibility both at the beginning of storage and even during long-term storage and provides excellent spouting stability over a wide temperature range from a low temperature to a high temperature.

What is claimed is:

1. An ink-jet recording oil-based ink comprising a pigment; a dispersing agent comprising a reaction product of a polyamine compound and a self condensation product of 12-hydroxystearic acid; a saturated hydrocarbon solvent comprising a liquid paraffin as a main component; and a vegetable oil, the ink having a surface tension of 26 to 30 dyne/cm at 25° C. and a contact angle on a polytetrafluoroethylene plate of 40° to 50° at 25° C., and satisfying the following relationship:

$$W_{HC}/W_{VC} > 10$$

wherein $W_{HC}$ is the weight of the saturated hydrocarbon solvent and $W_{VC}$ is the weight of the vegetable oil.

2. The ink-jet recording oil-based ink of claim 1, wherein the dispersing agent comprises a reaction product of polyallylamine and a self condensation product of 12-hydroxystearic acid.

3. The ink-jet recording oil-based ink of claim 1, wherein the content of the liquid paraffin in the saturated hydrocarbon solvent is 70% by weight or more.

4. The ink-jet recording oil-based ink of claim 1, wherein the liquid paraffin contains 20% by weight or more of a monocyclic cycloparaffin, and has a surface tension of 26 to 30 dyne/cm at 25° C. and a viscosity of 20 mPa·s or less at 25° C.

5. The ink-jet recording oil-based ink of claim 1, wherein the saturated hydrocarbon solvent further contains an isoparaffin.

6. The ink-jet recording oil-based ink of claim 1, which further contains a petroleum resin and/or a rosin-modified maleic resin.

7. The ink-jet recording oil-based ink of claim 1, which has a solidifying point of −10° C. or less.

8. The ink-jet recording oil-based ink of claim 1, which has a volume resistivity of $10^8$ Ω·cm or more.

* * * * *